United States Patent [19]

Warfield et al.

[11] 4,156,162

[45] May 22, 1979

[54] WINDER MOTOR CONTROL SYSTEM

[75] Inventors: Glenn R. Warfield, Lancaster; Michael W. Jenkins, Heath Springs, both of S.C.

[73] Assignee: Dana Corporation, Toledo, Ohio

[21] Appl. No.: 778,010

[22] Filed: Mar. 16, 1977

[51] Int. Cl.² ............................................. H02P 5/00
[52] U.S. Cl. .................................... 318/434; 318/433
[58] Field of Search .................. 318/6, 331, 332, 327, 318/328, 432, 433, 434, 339, 342; 242/75, 51

[56] References Cited

U.S. PATENT DOCUMENTS

| 3,582,746 | 6/1971 | Nye, Jr. et al. | 318/434 |
|---|---|---|---|
| 3,671,835 | 6/1972 | McMenamy | 318/331 |
| 3,697,844 | 10/1972 | Dinger | 318/331 |
| 3,716,772 | 2/1973 | Larson | 318/332 |
| 3,781,620 | 12/1973 | Toth | 318/331 |
| 3,887,855 | 6/1975 | Kilmo | 318/433 |

Primary Examiner—David Smith, Jr.
Attorney, Agent, or Firm—Wilson, Fraser & Clemens

[57] ABSTRACT

A system for controlling the speed-torque characteristic of a direct current motor which advantageously can be utilized to drive a surface wind machine for winding web material under controlled tension. The system generates a desired speed signal which is compared with a signal representing the actual motor speed to control a gating circuit and rectifier bridge for applying a selectively variable magnitude direct current voltage to the motor armature to cause the motor to run at the desired point on the speed-torque characteristic curve. The system generates a maximum no load speed adjustment signal which is compared with a speed adjustment signal to generate the desired speed signal. The motor armature current is sensed to generate a scaled armature current signal representing a decrease in the no load speed due to the load imposed on the motor. The system also generates a tension adjustment signal which defines a rate of decrease from the no load speed value to establish the speed-torque characteristic. The tension adjustment signal is compared with the scaled armature current signal to generate the speed adjustment signal thereby defining the slope of the speed-torque characteristic curve.

13 Claims, 3 Drawing Figures

WINDER MOTOR CONTROL SYSTEM

BACKGROUND OF THE INVENTION

1. Field of the Invention

The present invention relates generally to a speed-torque control for an electric motor and in particular to a system for controlling a constant field, direct current motor to define a speed-torque curve to limit the tension applied to a web material being wound on a surface wind machine.

2. Description of the Prior Art

Over the years, the demand for plastic, cloth, paper and metal materials in sheet form has increased so that winding system having improved capabilities have been required. One of the most important parameters in the winding process is the tension applied to the material as it is wound on the take-up roller. The tension determines the tightness and compression in the roll of wound material; the probability of breakage of the material with loss of material and time; and, in some cases, the thickness of the material. Therefore, it is desirable to be able to control the tension applied to the material so as to produce a high quality product.

In some operations it is desirable to maintain a constant tension, while, in others, it is sufficient to define a speed-torque curve which limits the maximum torque which can be applied by the motor. Most control systems utilize some form of direct current motors which are more easily controlled than other types of motors in terms of speed and/or torque output. Since the diameter of the roller increases as the material is being wound, the motor torque must be increased to compensate for the increased moment arm from the center of the roll drive shaft to the periphery of the roll if constant tension is to be applied to the material. One early method of control was a roll diameter measuring rheostat which controlled the field excitation of the motor. Such a mechanical connection to the roll was susceptible to damage when there was a breakage in the material. In the alternative, the motor was supplied with power from a main generator. A tensiometer riding on the web generated an electrical signal representing tension to an amplidyne generator which in turn adjusted the field excitation for the main generator to control the torque generated by the motor. The prior art also employed a dancer arm for sensing web tension. The arm was pivotally mounted and the web was passed around a dancer roller wherein tension on the web tended to rotate the dancer arm which was biased, for example, by a pneumatic cylinder connected to the arm. The position of the arm was sensed to control the speed of the winder motor which was applying the tension to the web. As the diameter of the roll increased, the speed of the motor was decreased so that more torque was applied to the roll to equal the product of the constant tension and the increasing roll diameter.

However, some winding operations do not require constant tension and can produce an acceptable product by controlling the motor at constant speed, at constant torque or along a limited speed-torque curve. In a constant field direct current motor, such as a permanent magnet field, wound rotor motor or a shunt motor having a separately excited field, the armature voltage is proportional to the motor speed and the armature current is proportional to the motor torque. Therefore, the motor control systems can sense either or both of the armature voltage and current to compare with one or more control signals for defining the speed-torque point at which the motor operates for a given load. For example, one prior art control system regulates the speed of a shunt field, direct current motor so as to maintain constant speed over a wide torque range. A first feedback signal is generated as a function of the counter—E.M.F. during free-wheeling and a second feedback signal is generated as a function of the armature current during free-wheeling. These two feedback signals are then combined in such a manner that the energy supplied to the armature is decreased with increasing counter—E.M.F. and is increased with increasing armature current so as to provide substantially constant speed. Such a control system is disclosed in U.S. Pat. No. 3,470,437.

Another form of prior art control circuit is one utilizing armature voltage and current feedback to maintain constant speed up to a predetermined torque and constant torque thereafter. The circuit compares a signal proportional to the motor speed with a desired speed signal to maintain constant speed. When a predetermined armature current is reached, the circuit bypasses the speed control and a signal proportional to the motor torque is compared with a desired torque signal to maintain constant torque. U.S. Pat. No. 3,475,672 discloses a motor control system which functions in this manner.

A further form of prior art control circuit simultaneously utilizes speed and torque proportional signals to define a speed-torque curve for a motor. A signal representing the motor current is compared to a motor-current reference signal to control the speed of the motor. The current reference signal is changed in dependence upon signals corresponding to the relationship between the actual speed of the motor and the motor speed corresponding to reel initial winding speed at the existing web speed to achieve the desired torque variation under loaded conditions and to limit sharply the speed of the motor under unloaded conditions. The signal for changing the current reference potential is derived by comparing the potential across the motor with a motor reference potential. When the motor reference potential is higher than the potential across the motor corresponding to a loaded condition, a given proportion of the difference is added to the motor current reference potential. This, in turn, demands that the current drawn by the motor increase correspondingly, and this increase is effected by controlling the power supply unit for the motor. When the motor is unloaded and is free-wheeling, the potential across the motor becomes greater than the motor-potential reference, and under these circumstances, a substantially higher proportion of the difference between the motor potential and the motor potential reference potential is subtracted from the motor current reference potential so that the power supply unit is actuated to supply substantially less power to the motor and the speed of the motor is limited. Thus, under loaded conditions, the torque of the motor and its speed follows a predetermined desired pattern and under unloaded conditions, the speed of the motor is limited. Such a control system is disclosed in U.S. Pat. No. 3,073,996.

SUMMARY OF THE INVENTION

The present invention concerns a system for controlling a constant field, direct current motor so as to define a desired speed-torque curve. A signal comparator circuit compares an armature voltage feedback signal representing the actual speed of the motor with a desired speed signal representing an operating point on a speed-torque curve to generate a speed control signal. A gating circuit responds to the speed control signal by gating a rectifier bridge having controlled rectifier means for full wave rectifying alternating current power to generate direct current power which is applied to the motor armature. The magnitude of the control signal determines the phase angle at which the rectifying means is fired to selectively control the average magnitude of the voltage applied to the armature.

An armature current feedback signal representing the actual torque produced by the motor is modified and compared with a tension adjustment signal to generate a speed adjustment signal. A signal representing the magnitude of the armature current is modified by scaling to correct for the horsepower of the motor being controlled. The tension adjustment signal represents a reduction in maximum torque for defining the slope of the speed-torque curve. The speed adjustment signal and a signal representing a maximum no load speed adjustment for the motor are compared in another signal comparator circuit to generate the desired speed signal.

Thus, the motor control system according to the present invention selectively varies the average magnitude of the direct current voltage applied to the motor armature to define a desired speed-torque curve for the motor. The desired curve has lower no load speed and stall torque values than the speed-torque characteristic curve for the motor when supplied with a constant magnitude direct current voltage corresponding to the uncontrolled full wave rectified output of the bridge. The motor operates along the desired speed-torque curve as defined by the load imposed by the web material as it is being wound. The control system protects the web winder by limiting the no load speed should the web break and protects the web material by limiting the stall torque to prevent breakage or stretch of the material should the winding load substantially increase.

It is an object of the present invention to provide a motor control system for selectively defining one of a plurality of speed-torque curves for controlling the operation of a direct current motor.

It is another object of the present invention to provide a motor control system for a web winder drive motor to protect the web winder from overspeed and the web material from excessive tension conditions during the winding process.

DESCRIPTION OF THE PREFERRED EMBODIMENT

Figure 1:
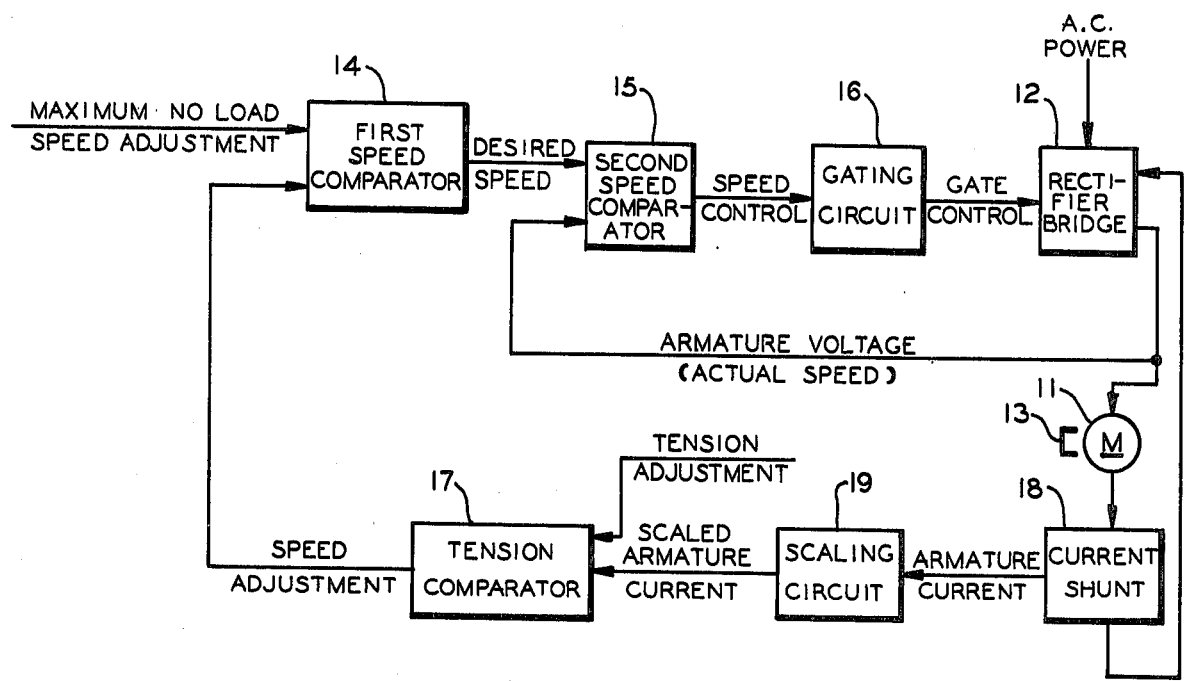
FIG. 1 is a block diagram of a motor control system according to the present invention.

The present invention concerns a control circuit for a constant field, direct current motor which advantageously can be utilized to control the tension applied to a web or strip of material being wound on a surface wind machine driven by the motor. As shown in FIG. 1, a direct current motor 11 has its armature connected to the output of a rectifier bridge 12 to receive direct current power. The bridge 12 is connected to an alternating current power source (not shown) and includes rectifying means for converting the a.c. input power to d.c. output power. Typically, the motor 11 can have a shunt field (not shown) excited from a constant voltage source or a permanent magnet field 13, as shown, to provide the constant field.

Figure 2:
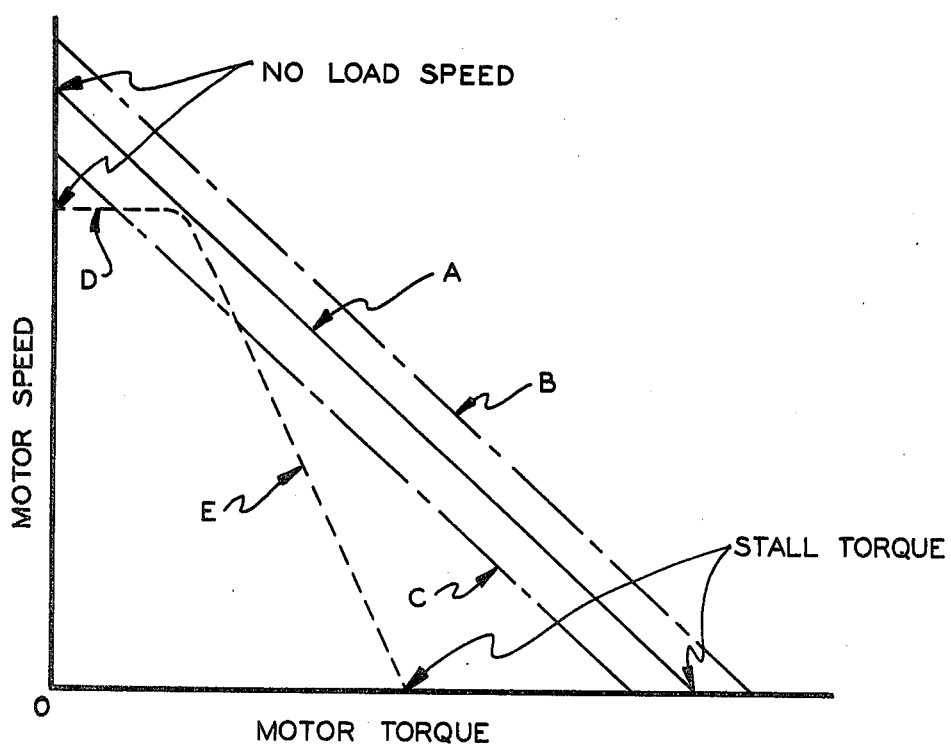
FIG. 2 is a plot of a speed versus torque curve for a motor controlled by the control system of FIG. 1.

The speed-torque characteristics of the motor 11 can be varied by controlling the applied armature voltage. If the rectifier bridge 12 includes at least one controlled rectifier means, the average magnitude of the d.c. output voltage can be controlled to shift the speed-torque curve. There is shown in FIG. 2 a speed-torque Curve A representing the range of speed and torque output values for the motor 11 from maximum no load speed to maximum stall torque at a predetermined constant magnitude supply voltage. If the supply voltage magnitude is increased, the curve will shift upwardly as shown by a dashed curve B and, if the supply voltage magnitude is decreased, the curve will shift downwardly as shown by a dashed curve C, curves B and C being parallel to the curve A.

The control circuit according to the present invention limits the maximum speed and torque outputs of the motor 11 to protect against damage to the winder and to the web or sheet during the winding operation. As shown in FIG. 2, the control circuit defines a maximum no load portion D wherein the maximum no load speed is limited to a predetermined maximum value for a range of torque on the curve A. The control circuit can also limit the maximum stall torque to a value which defines a new speed-torque curve E having the same maximum no load D. The control circuit forces the motor to work along the curves D and E by controlling the average magnitude of the voltage applied by the rectifier bridge 12.

A pair of signal comparators 14 and 15 function to generate an output signal to a gating circuit 16 which in turn phase controls the rectifying means in the rectifier bridge 12 to generate the desired d.c. output power. The second speed comparator 15 receives a signal representing the desired speed from the first speed comparator 14 at one input and an armature voltage feedback signal representing the actual speed of the motor at another input. The comparator 15 is responsive to the input signals to generate a speed control signal representing the difference between the two input signals to the gating circuit 16. The comparator 15 will generate the speed control signal to the gating circuit 16 which responds by generating a gate control signal to the rectifier bridge 12. The controlled rectifier means in the bridge 12 is responsive to the gate control signal to pass a portion of each half cycle of the a.c. input wave form sufficient to generate a d.c. output voltage of a magnitude which will maintain the desired speed. If the magnitudes of either or both the desired speed and actual speed signals change such that the actual speed is less than the desired speed, the comparator 15 will signal the gating circuit 16 to increase the conduction phase angle of the rectifying means so as to increase the magnitude of the d.c. output voltage to increase the motor speed. If the signals change such that the actual speed is greater than the desired speed, the conduction phase angle is decreased to decrease the magnitude of the d.c. output voltage to decrease the motor speed.

The inputs to the first speed comparator 14 are a maximum no load speed adjustment signal at one input and a speed adjustment signal at the other input. The speed adjustment signal is generated by a tension comparator 17 which responds to a tension adjustment signal and a scaled armature current signal representing armature current feedback. At no load, the magnitude of the speed adjustment will be at a minimum and the maximum no load speed adjustment signal will define the no load speed upper end of the desired speed-torque curve. As the load increases, the curve D is generated until the speed adjustment signal magnitude exceeds the maximum no load speed adjustment signal magnitude to define the sloped portion of the speed-torque curve.

The load on the motor determines the current flow from the rectifier bridge 12, through the armature of the motor 11 and a current shunt 18 connected in series and back to the bridge. The shunt 18 generates a signal representing armature current to a scaling circuit 19. Since motor torque is proportional to the armature current, the circuit 19 selectively scales the armature current signal to compensate for different horsepower motors. The scaled armature current signal is the input to the tension comparator circuit 17 which determines the rate at which the motor speed decreases as the motor load increases. The other input to the comparator 17 is a tension adjustment signal which defines the maximum stall torque for the motor and therefore, establishes the slope of the speed-torque curve. Therefore, it can be seen that the maximum no load speed adjustment signal and the tension adjustment signal can be utilized to adjust the maximum speed and the maximum stall torque for defining a new speed-torque curve.

Figure 3:
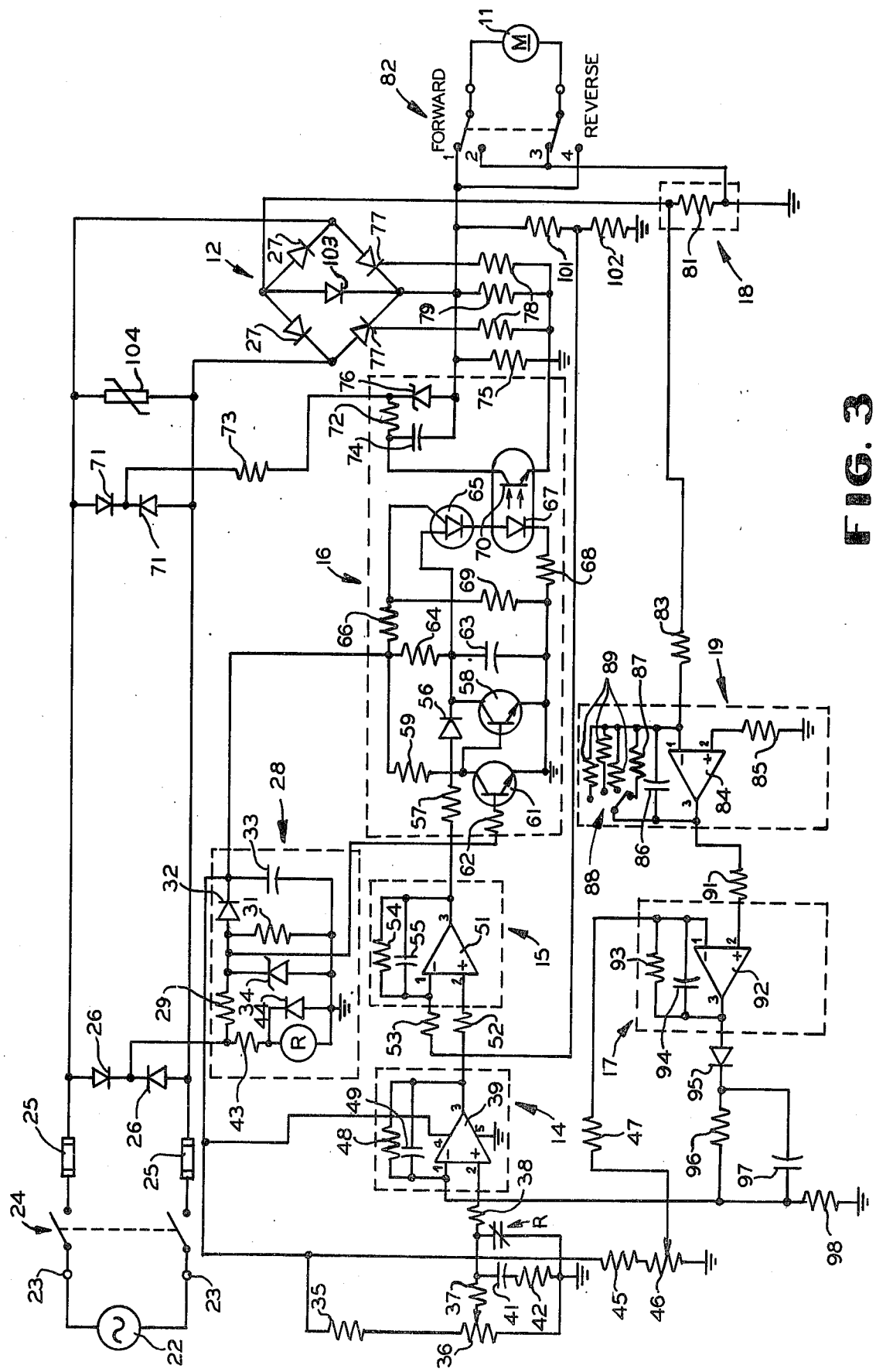
FIG. 3 is a schematic diagram of the motor control system of FIG. 1.

There is shown in FIG. 3 a schematic diagram of the control circuit of FIG. 1. An external alternating current power supply 22 is connected to a pair of input terminals 23 which are connected to one side of a double pole, single throw on-off switch 24. The other side of the switch 24 is connected through a pair of fuses 25 to an anode of each of a pair of diodes 26 having their cathodes connected together. The diodes 26 cooperate with a pair of diodes 27 in the bridge 12 to provide full wave rectified direct current power to a regulator circuit 28. The cathodes of the diodes 26 are connected to the system ground potential through a pair of series connected resistors 29 and 31 which function as a voltage divider. A diode 32 has an anode connected to the junction of the resistors 29 and 31 and a cathode connected to one side of a capacitor 33 which has its other side connected to the system ground potential. The capacitor 33 smoothes the full wave rectified power from the diodes 26 to provide regulated power to the various circuits in the control system. A zener diode 34 has an anode connected to the system ground potential and a cathode connected to the junction of the resistors 29 and 31. The zerner diode 34 provides a low resistance path to ground for any negative potential spikes which might appear on the full wave rectified power to eliminate them from the average magnitude of the voltage appearing across the resistor 31. The diode 32 prevents the capacitor 33 from discharging during the time the magnitude of the full wave rectified wave form is less than the average magnitude of the regulated voltage.

The regulator circuit 28 supplies power to each of the circuits in the control system and maintains a constant magnitude d.c. voltage which is utilized to generate the maximum no load speed adjustment and tension adjustment signals. A resistor 35 and a potentiometer 36 are connected in series between the output of the regulator circuit 28 at the cathode of the diode 32 and the system ground potential. A pair of resistors 37 and 38 are connected between a tap of the potentiometer 36 and a non-inverting input 39-2 of an operational amplifier 39.

A capacitor 41 and a resistor 42 are connected between the junction of the resistors 37 and 38 and the system ground potential. A normally closed pair of relay R contacts are connected in parallel with the capacitor 41 and the resistor 42 to prevent the capacitor from charging and to hold the input 39-2 at the system ground potential. When the on-off switch 24 is closed, current will flow through a resistor 43 and a coil of the relay R connected in series between the cathodes of the diodes 26 and the system ground potential. The relay R coil is thereby energized to open the contacts allowing the capacitor 41 to charge to a magnitude equal to that portion of the regulated voltage which is dropped across the potentiometer 36 between the tap and the system ground potential. The voltage across the capacitor 41 also determines the amount of current flowing to the input 39-2 through the resistor 38 which current represents the maximum no load speed adjustment signal. A diode 44 has an anode connected to the system ground potential and a cathode connected to the junction of the resistor 43 and the relay R coil to provide a discharge path for the collpasing field in the coil when the on-off switch 24 is opened. The resistor 42 limits the current through the relay contacts as the capacitor 41 is discharged through them when the switch 24 is opened.

The output of the regulator circuit 28 at the cathode of the diode 32 is also connected a resistor 45 and a potentiometer 46 connected in series to the system ground potential to generate the tension adjustment signal. The potentiometer 46 has a tap connected to the tension comparator circuit 17 through a resistor 47 to provide the tension adjustment signal. An inverting input 39-1 of the amplifier 39 is connected to the output of the tension comparator circuit 17 as will be discussed later.

The amplifier 39 generates an output signal at an output 39-3 having a magnitude and polarity determined by the difference between the signals at the inputs 39-1 and 39-2 and limited in magnitude by the voltages applied to a positive power supply input 39-4 and a negative power supply input 39-5. The input 39-4 is connected to the regulator circuit 28 at the cathode of the diode 32 to receive the positive polarity regulated power supply voltage and the input 39-5 is connected to the system ground potential. Therefore, the output signal is limited by the power supply voltage when the signal at the non-inverting input 39-2 is greater in magnitude than the signal at the inverting input 39-1 and is generated at the system ground potential when the input signals are reversed in magnitude. A feedback resistor 48 is connected between the inverting input 39-1 and the output 39-3 for negative feedback to stabilize the operation of the amplifier. Typically, the resistor 48 has the same value as the resistors 38 and 47 to provide unity gain. A capacitor 49 is connected in parallel with the resistor 48 to filter high frequency noise.

The output from the first signal comparator 14, as generated at the amplifier output 39-3, is the desired speed signal which is applied to a non-inverting input 51-2 of an operational amplifier 51 through a resistor 52. The power supply inputs for the amplifier 51 are connected in the same manner as those of the amplifier 39 and are not shown. An inverting input 51-1 of the amplifier 51 receives the armature voltage feedback signal through a resistor 53 from a source to be described later. As with the amplifier 39, the resistors 52 and 53 can be of the same value such that the currents flowing into the amplifier 51 will be directly proportional to one another in accordance with the ratio of the voltages which generated them. The amplifier has an output 51-3 at which there is generated the speed control signal reflecting the difference between the desired speed signal and the armature voltage signal representing the actual speed of the motor 11. A feedback resistor 54 is connected between the inverting input 51-1 and the output 51-3 for negative feedback to stabilize the operation of the amplifier and, typically, can have a value which provides a gain of ten for the input signals. A capacitor 55 is connected in parallel with the resistor 54 to filter high frequency noise.

The output from the second signal comparator 15, as generated at the amplifier output 51-3, is the speed control signal which is applied to the gating circuit 16. The output 51-3 is connected to an anode of a diode 56 through a resistor 57. A cathode of the diode 56 is connected to a collector of a NPN transistor 58 having an emitter connected to the system ground potential and a base connected to the regulator circuit 28 at the cathode of the diode 32 through a resistor 59 to receive the regulated power supply voltage. The base of the transistor 58 is also connected to the collector of a NPN transistor 61 having an emitter connected to the system ground potential and a base connected to the regulator circuit 28 through a resistor 62. The resistor 62 is connected to the junction of the resistor 29 and the anode of the diode 32 to apply the half wave rectified input voltage to the base of the transistor 61 to alternately turn it on and off every half cycle of the a.c. power supply voltage.

The cathode of the diode 56 is connected to one side of a capacitor 63 having its other side connected to the system ground potential, to the regulator circuit 28 at the cathode of the diode 32 through a resistor 64 to receive the regulated power supply voltage and to an anode of a programmable unijunction transistor (PUT) 65 having a gate connected to the regulator circuit 28 at the cathode of the diode 32 through a resistor 66 to receive the regulated power supply voltage. A cathode of the PUT 65 is connected to an anode of a photoemissive diode 67 having a cathode connected to the system ground potential through a resistor 68. A resistor 69 is connected between the gate of the PUT 65 and the system ground potential.

During the central portion of each half wave of the alternating current input voltage, the transistor 61 will be turned on to drop its collector voltage near the system ground potential thereby turning off the transistor 58. The speed control signal from the second signal comparator 15 charges the capacitor 63 through the resistor 57 and the diode 56 aided by the regulated power supply voltage charging through the resistor 64. The gate of the PUT 65 is biased by the voltage generated at the junction of the resistors 66 and 69 which function as a divider for the regulated power supply voltage. Thus, the PUT 65 will turn on when the voltage across the capacitor 63 reaches a magnitude determined by the gate biasing point. When the PUT is turned on, current, limited by the resistor 68, flows through the diode 67 to generate a light output.

During the initial and terminal portions of the half waves, the transistor 61 will be turned off and its collector will be at the regulated power supply voltage to turn on the transistor 58. The capacitor 63 will quickly discharge through the transistor 58 and will not begin to charge until the transistor 58 is turned off. Therefore, the capacitor 63 is reset to a voltage representing the drop across the transistor 58 and will begin to charge at the same time each half cycle of the alternating current input voltage. The time delay before the PUT 65 is turned on is a function of the magnitude of the speed control signal so that for a large difference between the actual and desired motor speeds the capacitor 63 will charge faster and the diode 67 will emit light earlier in the half cycle than when there is a small difference between the actual and desired motor speeds.

A base of a photo transistor 70 receives the light from the diode 67 and has a collector connected to the cathodes of a pair of diodes 71 through a pair of resistors 72 and 73. The diodes 71 each have an anode connected to a corresponding one of the fuses 25. The diodes 71 and the diodes 27 full wave rectify the alternating current input voltage to charge a capacitor 74 having one side connected to the junction of the resistor 72 and the collector of the transistor 70 and another side connected to the system ground potential through a resistor 75. A zener diode 76 has an anode connected to the junction of the capacitor 74 and the resistor 75 and a cathode connected to the junction of the resistor 72 and the resistor 73 to limit the maximum voltage across the capacitor 74.

The photo transistor 70 has an emitter connected to a gate of each of a pair of silicon controlled rectifiers (SCR's) 77 through each of a pair of resistors 78. The SCR's 77 each have an anode connected to opposite sides of the alternating current power supply 22 through the switch 24 and the fuses 25. The SCR's 77 each also have a cathode connected to the emitter of the transistor 70 through a resistor 79 and to the junction of the capacitor 74 and the resistor 75. When the photo transistor 70 is turned on, the capacitor 74 will provide the high current necessary to gate on the one of the SCR's 77 which is forward biased by the a.c. wave form. The SCR's 77 and the diodes 27 function as the controlled full wave rectifier bridge 12 to provide direct current power at the bridge outputs defined by the junctions of the cathodes of the SCR's 77 and the anodes of the diodes 27. The average magnitude of the bridge output is determined by the portion of each half cycle during which the SCR's are turned on as controlled by the speed control signal from the second speed comparator 15.

The anodes of the diodes 27 are connected to the system ground potential through a reistor 81 which functions as the current shunt 18. The cathodes of the SCR's 77 are connected to a forward terminal 82-1 and a reverse terminal 82-4 of a reversing switch 82. A forward terminal 82-2 and a reverse terminal 82-3 are connected to the system ground potential. The armature of the motor 11 is connected between a pair of movable contacts of the switch 82. When the contacts are in the position illustrated, current will flow from the SCR's 77 through the forward terminal 82-1, the motor 11, the forward terminal 82-3, the resistor 81 and back to the diodes 27 such that the motor 11 will rotate in a direction designated as the forward direction. When the contacts are switched to the forward terminal 82-2 and the reverse terminal 82-4, the current will flow through the motor 11 in the opposite direction such that the motor rotates in the reverse direction.

The magnitude of the voltage drop across the resistor 81 is directly proportional to the magnitude of the current flowing through the armature of the motor 11 and is applied through a current limiting resistor 83 to an inverting input 84-1 of an operational amplifier 84 in the scaling circuit 19. The power supply inputs for the amplifier 84 are connected in a manner similar to those of the amplifier 39 and are not shown. A non-inverting input 84-2 is connected to the system ground potential through a resistor 85 to provide a reference for the armature current signal such that the voltage drop across the resistor 81 is the voltage difference between the inputs to the amplifier 84. A capacitor 86 is connected between the inverting input 84-1 and an output 84-3 to filter high frequency noise. A plurality of feedback resistors can each be selectively connected between the input 84-1 and the output 84-3 to determine the gain of the amplifier 84. For example, a resistor 87 is connected to the input 84-1 and to the output 84-3 through one contact and the common contact of a multiposition switch 88. The values of the resistors 83 and 87 determine the gain of the amplifier 84. Since the range of the armature current will vary with the horsepower rating of the motor 11, the gain of the amplifier 84 can be changed to scale the armature current signal so that the magnitude of the output signal generated by the scaling circuit 19 will be the same for all motors operating at the same percentage of their respective maximum or stall armature current. Three resistors 89, each of a different value, are also shown connected to separate contacts of the switch 88 which can be selectively connected to the common contact to change the gain. However, more or less resistors can be utilized depending upon how many different horsepower motors are to be controlled by the system.

The output 84-3 of the amplifier 84 is connected to the tension comparator circuit 17 through a resistor 91. The resistor 91 is connected to a non-inverting input 92-2 of an operational amplifier 92 to receive the scaled armature current signal from the scaling circuit 19. An inverting input 92-1 is connected to the top of the potentiometer through the resistor 47 to receive the tension adjustment signal. A feedback resistor 93 is connected between the input 92-1 and an output 92-3 of the amplifier 92 to define the amplifier gain. A capacitor 94 is connected in parallel with the resistor 93 to filter the high frequency noise. The power supply inputs for the amplifier 92 are connected in a manner similar to those of the amplifier 39 and are not shown.

The output 92-3 is connected to an anode of a diode 95 having a cathode connected to the input 39-1 of the amplifier 39 through a resistor 96. A capacitor 97 is connected in parallel with the resistor 96 and a resistor 98 is connected between the input 39-1 and the system ground potential. The resistors 96 and 98 function as a voltage divider to define the magnitude of the speed adjustment signal for the first speed comparator circuit 14. The capacitor 97 stores a charge and is blocked from discharging through the output 92-3 by the diode 95 when the magnitude of the output signal from the amplifier 92 decreases. The capacitor 97 provides a gradually decreasing signal to the amplifier 39 should the output signal from the amplifier 92 suddenly decrease due to a broken web which removes the load from the motor. The capacitor 97 will discharge such that the first and second speed comparators slowly change the speed control signal. At no load speed, only the current due to the motor losses will be flowing through the armature of the motor 11. Therefore, the voltage at the input 39-1 will be at its lowest magnitude and the difference between the maximum no load speed adjustment signal and the speed adjustment signal will be the greatest to define the no load speed point on the curve D of FIG. 2. As the motor load and thus the armature current increases, the tension comparator circuit 17 will generate a signal of increasing magnitude as the speed adjustment signal to decrease the difference between the input signals to the amplifier 39 thereby defining the slope of the curve E. When the load on the motor 11 increases to a value which generates a speed adjustment signal equal to the maximum no load speed adjustment signal, the desired speed signal generated by the comparator 14 will go to zero to define the stall torque point on the curve E.

A pair of resistors 101 and 102 are connected in series between the junction of the cathodes of the SCR's 77 and the system ground potential. The inverting input 51-1 of the amplifier 51 is connected to the junction of the resistors 101 and 102 through the resistor 53. During the time period from the initiation of each half cycle of the a.c. wave form to the point of firing the SCR's 77, there is no voltage applied to the armature of the motor 11 and the motor is in effect "free-wheeling." During this time period, the motor generates a counter—E.M.F. having a magnitude proportional to the motor speed. The counter—E.M.F. appears across the resistors 101 and 102 where it is voltage divided to generate the armature voltage feedback signal to the second speed comparator circuit 16.

A diode 103 has an anode connected to the junction of the anodes of the diodes 27 and a cathode connected to the junction of the cathodes of the SCR's 77. A SCR will tend to remain turned on as long as there is current flowing through it even though the gating signal has been removed. The field generated in the armature windings will sustain current flow through the armature, the turned on one of the SCR's 77 and the one of the diodes 27 connected to the turned on SCR. The diode 103 provides a path for this current to assist in turning off the turned on SCR to prepare for the next half cycle of the a.c. wave form.

A varistor 104 is connected across the a.c. power inputs of the bridge 12. The varistor is an electrical resistor which varies in resistance with the magnitude of the applied voltage. Thus, the varistor 104 functions to protect the motor control system from power surges on the input lines by providing a shunt path for the current flow at relatively high magnitude voltages.

In summary, the present invention concerns a system for controlling a direct current motor along a desired speed-torque characteristic curve. The motor advantageously can be a constant field motor such as a permanent magnet type or a shunt type having a separate field power source. The system includes a source of direct current power connected to the motor having means for selectively varying the magnitude of the voltage generated in response to a control signal. The d.c. power source includes a source of alternating current power, a rectifier bridge connected between the alternating current power source and the motor and having controlled rectifier means responsive to a gate control signal for selectively applying the alternating current power to the motor to generate the selectively varying magnitude voltage, and a gating circuit responsive to the control signal for generating the gate control signal.

The system also includes means responsive to the motor armature voltage for generating a signal representing the speed of the motor, means responsive to the motor armature current for generating a signal representing the magnitude of the armature current and means for generating the control signal in response to the motor speed signal and the armature current signal. The control signal generating means comprises a source of a signal representing a maximum no load speed adjustment for the motor; means responsive to the armature current signal for generating a signal representing an adjustment to the motor speed; and means responsive to the maximum no load speed adjustment signal, the speed adjustment signal and the motor speed signal for generating the control signal whereby the motor is controlled along the desired speed-torque characteristic curve. The means for generating the speed adjustment signal can include means for scaling the armature current signal to compensate for the horespower rating of the motor. The means for generating the speed adjustment signal can also include a source of a tension adjustment signal representing a decrease in the stall torque of the desired speed-torque characteristic curve and a comparator means responsive to the tension adjustment and the scaled armature current signal for generating the speed adjustment signal.

The control signal generating means includes a first comparator means having the maximum no load speed adjustment signal applied to one input and the speed adjustment signal applied to another input for generating a desired speed signal with a magnitude proportional to the difference between the magnitude of the signals at the inputs. The control signal generating means also includes a second comparator means having the desired speed signal applied to one input and the motor speed signal applied to another input for generating the control signal with a magnitude proportional to the difference between the magnitudes of the signals at the inputs.

In accordance with the provisions of the patent statutes, the principle and mode of operation of the invention have been explained and illustrated in its preferred embodiments. However, it must be understood that the invention may be practiced otherwise than as specifically illustrated and described without departing from its spirit or scope.

What is claimed is:

1. A system for controlling a direct current motor along a desired speed-torque characteristic curve including a source of direct current power connected to the motor armature having means for selectively varying the magnitude of the voltage generated in response to a control signal, means responsive to the motor armature voltage for generating a signal representing the speed of the motor, means responsive to the motor armature current for generating a signal representing the magnitude of the armature current, and means for generating the control signal in response to the motor speed signal and the armature current signal, the control signal generating means comprising:

a source of a signal representing a maximum no load speed adjustment for said motor;
   means responsive to said armature current signal for generating a signal representing an adjustment to the motor speed;
   means responsive to said maximum no load speed signal and said speed adjustment signal for generating a signal representing the desired speed of the motor; and
   means responsive to said desired motor speed signal and said motor speed signal for generating said control signal whereby said motor is controlled along said desired speed-torque characteristic curve.

2. A motor control system according to claim 1 wherein said direct current power source includes a source of alternating current power, a rectifier bridge connected between said alternating current power source and said motor armature and having controlled rectifier means responsive to a gate control signal for selectively applying said alternating current power to said motor to generate said selectively varying magnitude voltage, and a gating circuit responsive to said control signal for generating said gate control signal.

3. A motor control system according to claim 1 wherein said means for generating said speed adjustment signal includes means for scaling said armature current signal to compensate for the horsepower rating of said motor and means for generating said speed adjustment signal in response to said scaled armature current signal.

4. A motor control system according to claim 1 wherein said means for generating said speed adjustment signal includes a source of a tension adjustment signal and means responsive to said tension adjustment signal and said armature current signal for generating said speed adjustment signal representing a decrease in motor speed proportional to the magnitude of said armature current.

5. A motor control system according to claim 4 wherein said means responsive to said tension adjustment signal and said armature current signal for generating said speed adjustment signal includes a comparator means.

6. A motor control system according to claim 1 wherein said control signal generating means includes a first comparator means responsive to said maximum no load speed adjustment signal and said speed adjustment signal for generating said desired speed signal representing a point on said desired speed-torque characteristic curve and a second comparator means responsive to said desired speed signal and said motor speed signal for generating said control signal.

7. In a strip material winding process, a system for controlling a constant field direct current motor which is adapted for driving a surface winding machine along a desired speed-torque characteristic curve, the control system comprising:

a source of direct current power connected to the motor armature having means for selectively varying the magnitude of the output voltage generated in response to a control signal;
   means responsive to the motor aramture counter— E.M.F. for generating a signal representing the speed of the motor;
   means responsive to the motor armature current for generating a signal representing the magnitude of the armature current;
   means responsive to said armature current signal for generating a desired speed signal representing a point on said desired speed-torque characteristic curve; and
   means responsive to said desired speed signal and said motor speed signal for generating said control signal whereby said motor is controlled along said desired speed-torque characteristic curve.

8. A motor control system according to claim 7 wherein said direct current power source includes a pair of output terminals connected to opposite ends of the armature of said motor to apply said output voltage and wherein said motor speed signal generating means includes a voltage divider connected in parallel with said motor armature, said voltage divider generating said motor speed signal as a predetermined portion of the counter—E.M.F. generated by said motor armature.

9. A motor control system according to claim 7 wherein said armature current signal generating means is a current shunt connected in series between said direct current power source and the armature of said motor.

10. A motor control system according to claim 7 wherein said desired speed signal generating means includes means responsive to said armature current signal for generating a scaled armature current signal representing a decrease in motor speed proportional to the magnitude of the armature current, a source of a tension adjustment signal representing a decrease in the stall torque of said desired speed-torque characteristic curve, comparator means responsive to said tension adjustment signal and said scaled armature current signal for generating a speed adjustment signal, a source of a signal representing a maximum no load speed adjustment for said motor and means responsive to said maximum no load speed adjustment signal and said speed adjustment signal for generating said desired speed signal.

11. A motor control system according to claim 10 wherein said desired speed signal generating means includes a first signal comparator means having said maximum no load speed adjustment signal applied to one input and said speed adjustment signal applied to another input, said first signal comparator means generating said desired speed signal with a magnitude proportional to the difference between the magnitudes of the signals at said inputs.

12. A motor control system according to claim 11 wherein said control signal generating means includes a second signal comparator means having said desired speed signal applied to one input and said motor speed signal applied to another input, said second signal comparator means generating said control signal with a magnitude proportional to the difference between the magnitudes of the signals at said inputs.

13. A motor control system according to claim 10 wherein said speed adjustment signal generating comparator means has said scaled armature current signal applied to one input and said tension adjustment signal applied to another input, said comparator means generating said speed adjustment signal with a magnitude proportional to the difference between the magnitudes of the signals at said inputs.

* * * * *